UNITED STATES PATENT OFFICE.

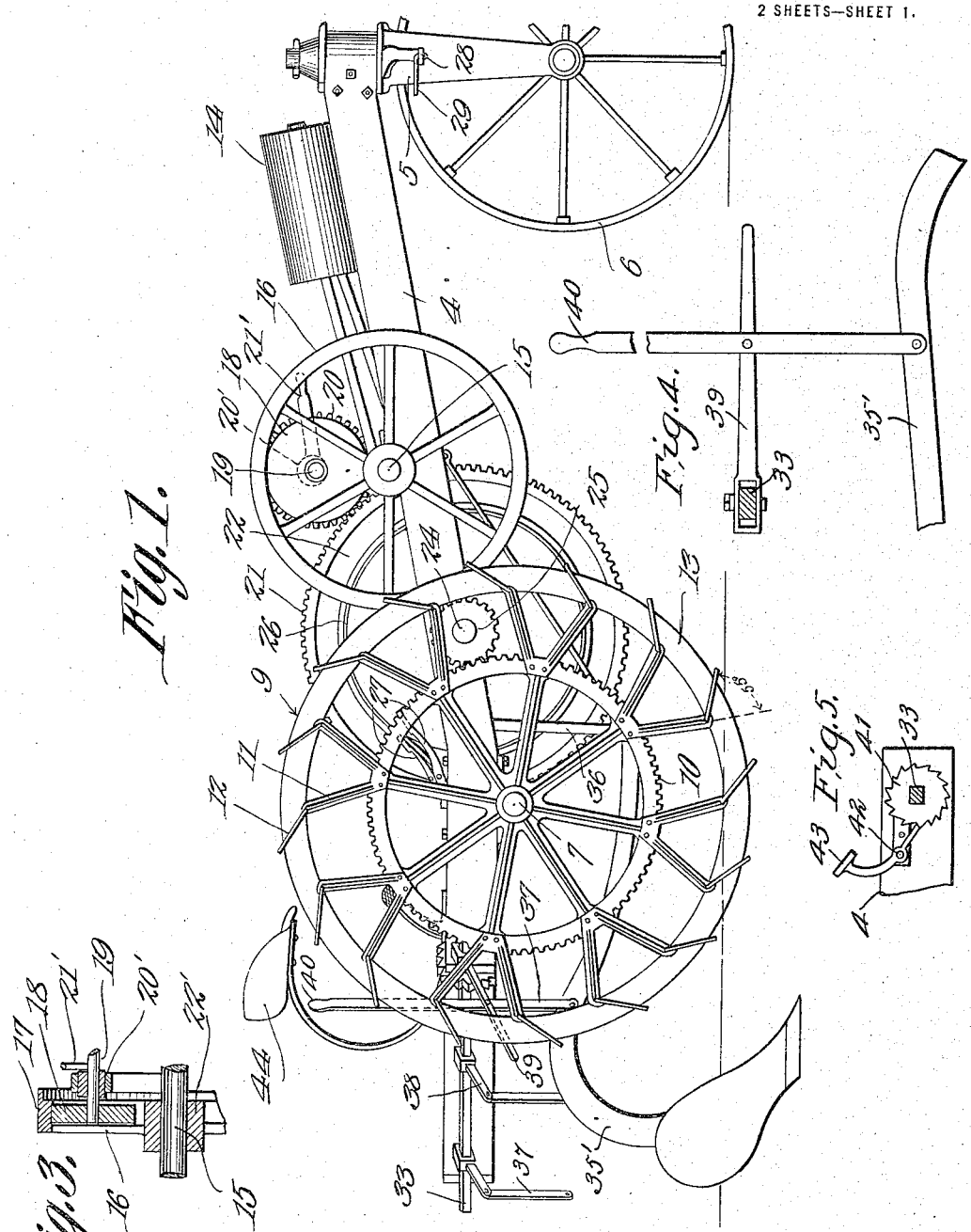

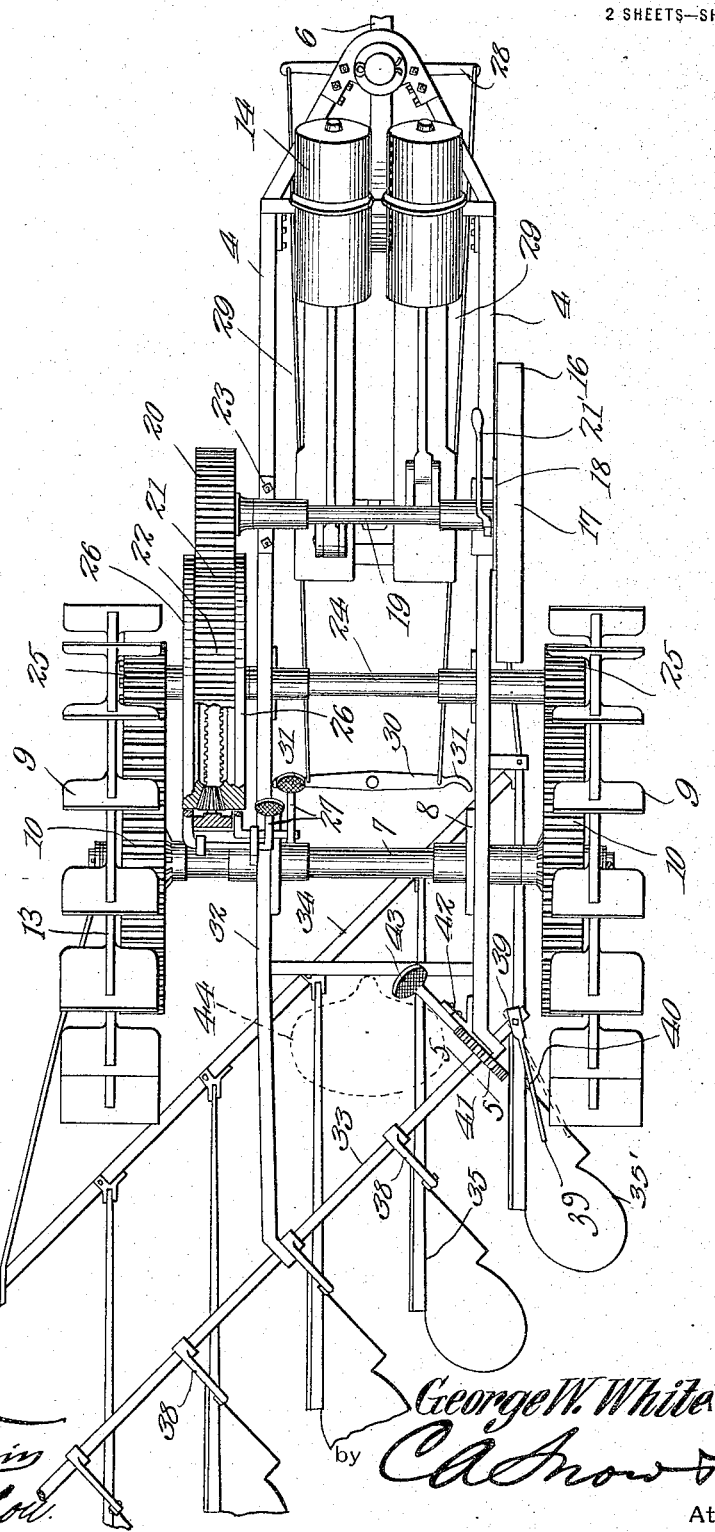

GEORGE W. WHITE, OF HUTCHINSON, KANSAS.

MOTOR-PLOW.

1,168,135.  Specification of Letters Patent.  Patented Jan. 11, 1916.

Application filed January 17, 1914. Serial No. 812,733.

*To all whom it may concern:*

Be it known that I, GEORGE W. WHITE, a citizen of the United States, residing at Hutchinson, in the county of Reno and State of Kansas, have invented a new and useful Motor-Plow, of which the following is a specification.

This invention relates to improvements in motor plows.

One of the objects of the invention is to provide a motor plow in which the plow is directly carried by the traction engine thus doing away with any extra supporting carriage, and in which the raising and lowering of the plow is mechanically effected by power directly derived from the traction wheels.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings accompanying this specification and forming a part thereof, the preferred embodiment of my invention is illustrated, in which:—

Figure 1 is a view in side elevation of my improved motor plow. Fig. 2 is a top plan view thereof. Fig. 3 is a detail view of the improved portion of the power transmitting and regulating mechanism. Fig. 4 is a vertical section showing in elevation, the means whereby the wiper arm is brought into operative relation with respect to the blades on one of the tractor wheels; Fig. 5 is a section on the line 5—5 of Fig. 2, the view illustrating the pawl and ratchet mechanism whereby the plow lifting shaft is controlled.

Referring to the drawings in which similar reference numerals designate corresponding parts throughout the several views, 4 is a pair of longitudinal beams which form the longitudinal frame of the machine. The frame 4 as disclosed in Fig. 1 extends upwardly adjacent the front end of the beam to which end is pivotally secured the front wheel supporting fork 5 which in turn carries the front wheel 6. The fork 5 is supported in a suitable bearing in the front extremity of the frame 4 and rotates about a vertical axis for the steering of the machine.

A rear axle 7 is mounted in suitable bearings 8 carried by the frame 4 and upon this axle are mounted two tractor wheels 9. Each tractor wheel includes the central portion 10 which is the main driving gear and to which the spokes 11 are rigidly secured. The spokes are arranged in pairs and are disposed at an angle one to the other so as to define V-shaped members with the apex rigidly secured to the rim of the gear 10. Carried at the outer extremities of the spokes and inclined at an angle thereto are the paddle blades 12 which are inclined at an angle of approximately 55° to the prolongation of the spoke as clearly illustrated in Fig. 1. A rim 13 extends through and is secured to the various paddle blades and strengthens the entire construction and also prevents a transverse skidding of the wheels. Forming the blades at the angle mentioned provides that when the tractor wheel sinks the usual amount into the ground the blade will as the wheels are driven forwardly contact with the ground in a flat manner and will thus obtain a maximum pressure thereon and impart the maximum tractive effort to the machine. A further feature of advantage arises from the fact that as the wheels are rotated, the blades will be withdrawn from the ground and be moved in a substantially longitudinal manner so that the wheels will be what might be termed self-cleaning, by which is meant that the blades will tend to rid themselves of the earth or other material which might cling thereto.

An internal combustion engine 14 is mounted upon the frame 4 and is of any preferred type, the exact details of construction of which have not been illustrated as they form no part of the present invention. The crank shaft 15 of the engine carries the usual fly wheel 16 which as illustrated in Fig. 3 is provided with the overhanging rim 17 with which contacts the friction wheel 18 driven thereby. The friction wheel 18 is mounted upon the shaft 19, and positioned upon the remote end of the latter is a spur gear 20 which in turn drives the external gear 21 of the differential 22. One end of the shaft 19 is mounted within the eccentric bearing 20' which may be rotated by the lever 21' to thus bring the upper periphery of the friction wheel 18 into contact with the inner surface of the rim 17 or, by shifting the lever 21' the said friction wheel is shifted into a neutral position out of contact with the fly wheel 16 or into a lowered position in which the lower periphery of the friction wheel 18 will contact with and be driven by the hub 22' of the fly wheel and in a reverse direction as well as at a much lower speed. It is to be noted that the bearing 23 at the remote end of the shaft 19 is so constructed that the shaft 19 may shift by the eccentric bearing as described.

The differential gearing 22 is mounted upon the shaft 24 upon the extremities of which shaft are mounted the gears 25 which mesh with and drive the main gear 10. The tractor wheels 9 are loosely mounted upon the shaft 7 so that the said wheels may be driven at different speeds by means of the differential gearing 22. A pair of band brakes 26 are disposed upon the opposite sides of the differential gearing and are actuated by the pedals 27. When one of the band brakes is applied one of the tractor wheels will be retarded whereas the opposite tractor wheel will be accelerated to thus turn the machine around in a small space as it is thought will be readily appreciated.

The front wheel supporting fork 5 is provided with the outstanding arm 28 and to which are secured the connecting rods 29 which in turn are connected with the lever 30 which latter is provided with the foot engaging portion 31 by means of which the front wheel may be turned to thus steer the vehicle coöperating with the pedals 27 to turn the machine in a small arc.

The longitudinal beams 4 extend a distance in the rear of the rear axle 7 as at 32 and support the angularly disposed shaft 33 and the angularly disposed beam 34. A plurality of plows 35 35' are pivotally secured at their front extremities to the downwardly extending rigid struts 36 which are carried by the beam 34 except the outermost plow 35' as illustrated in Fig. 1 are connected by means of the links 37 to arms 38 which are rigidly secured to the shaft 33. Thus as the shaft 33 is rotated the rear extremities of the plows are either raised or lowered as it is thought will be readily appreciated. In order to mechanically rotate the shaft 33 an arm 39 is movably secured thereto and is so arranged that the path of motion of its extremity intersects the path of rotation of one of the tractor wheels 9. The arm 39 is connected with the outermost plow 35' by means of a link which upstands above the arm 39 to form a resilient handle 40 by means of which the wiper arm 39 may be brought manually into the path of rotation of the wheel 9 and when so positioned one of the paddle blades will strike against the wiper arm and raise the same until the wiper arm will pass out of the path of motion of the wheel. In order to prevent the shaft from dropping back after it has been rotated by the wheel the pawl 42 is provided which coacts with the ratchet 41 to hold the same against reverse rotation. The upper extremity of the pawl is provided with the foot engaging portion 43 whereby it may be released and the plows allowed to lower into engagement with the ground.

A seat 44 is provided upon which the operator of the machine rests and when in such position he is able to reach the various controlling mechanisms as described to successfully operate the engine plow. Because the shaft 33 is disposed at an acute angle to the plane in which the wheel 9 rotates, the arm 39 will automatically clear itself from the blade of the wheel 9 as the latter rotates. The connection between the lever 40 and the beam of the plow 35' is a somewhat loose one, to the end that the part 39 may have the necessary lateral movement.

Having thus fully described my invention, what I claim is:—

1. A motor plow comprising tractor wheels with outstanding blades, a plow supporting beam supported by said wheels, a plow elevating shaft extending parallel to said beam, a plow pivotally secured to the beam and linkedly secured to an arm rigidly carried by said shaft, and mechanical means extending in the path of motion of the outstanding blades of the tractor wheels for mechanically rotating the shaft through a limited arc for the raising and lowering of the said plow.

2. A motor plow comprising tractor wheels with outstanding blades, a tractor frame carried thereby, a rearwardly extending beam carried by said frame, a plow secured thereto, a shaft carried by said frame and provided with an outstanding arm, links extending between the said arm and the said plow for the raising and lowering thereof, and a wiper arm carried by said shaft arranged with a portion of its path of rotation intersecting the path of rotation of the tractor blades.

3. A motor plow comprising tractor wheels with outstanding blades, a tractor frame carried thereby, a rearwardly extending beam carried by said frame, a plurality of plows secured thereto, a shaft carried by said frame and provided with a plurality of outstanding arms, links extending between said arms and said plows for the raising and lowering thereof, a wiper arm carried by said shaft arranged with a portion of its path of rotation intersecting the path of rotation of the tractor blades, and means engaging the said shaft preventing the reverse rotation thereof.

4. A plow comprising wheels, a frame carried thereby, a plow carried by said frame, and a wiper arm mechanically connected thereto so as to raise and lower the said plow, said wiper arm being mounted to oscillate in a plane lying at an angle to the plane of rotation of one of the wheels, the arc of oscillation of the wiper arm intersecting, for a predetermined distance, the path of rotation of one of the wheels.

In testimony that I claim the foregoing as my own, I have hereto affixed my signature in the presence of two witnesses.

GEORGE W. WHITE.

Witnesses:
C. L. SWEET,
M. M. STEVENS.

Copies of this patent may be obtained for five cents each, by addressing the "Commissioner of Patents, Washington, D. C."